United States Patent
Rundqvist

(10) Patent No.: US 7,275,638 B2
(45) Date of Patent: Oct. 2, 2007

(54) METHOD AND BLANK FOR MANUFACTURING A BENT CURVE ELEMENT, BENT CURVE ELEMENT, CURVE UNIT COMPRISING A BENT CURVE ELEMENT AND ALSO CONVEYING TRACK COMPRISING SUCH A CURVE UNIT

(75) Inventor: Andreas Rundqvist, Floda (SE)

(73) Assignee: Flexlink Components AB (SE)

( * ) Notice: Subject to any disclaimer, the term of this patent is extended or adjusted under 35 U.S.C. 154(b) by 220 days.

(21) Appl. No.: 10/511,670

(22) PCT Filed: Apr. 14, 2003

(86) PCT No.: PCT/SE03/00593

§ 371 (c)(1),
(2), (4) Date: Oct. 18, 2004

(87) PCT Pub. No.: WO03/089340

PCT Pub. Date: Oct. 30, 2003

(65) Prior Publication Data

US 2005/0167249 A1    Aug. 4, 2005

(30) Foreign Application Priority Data

Apr. 19, 2002    (SE)    .................................... 0201206

(51) Int. Cl.
*B65G 21/10*    (2006.01)

(52) U.S. Cl. ................. 198/861.1; 198/861.2; 198/839

(58) Field of Classification Search ............. 198/860.1, 198/860.2, 861.1, 861.2, 831, 839, 841
See application file for complete search history.

(56) References Cited

U.S. PATENT DOCUMENTS

| | | | | |
|---|---|---|---|---|
| 3,920,115 A | * | 11/1975 | Craggs ..................... | 198/861.1 |
| 4,144,965 A | * | 3/1979 | Alldredge et al. ....... | 198/861.2 |
| 5,782,340 A | | 7/1998 | Dolan | |
| 2003/0173194 A1 | * | 9/2003 | Ledingham .............. | 198/860.1 |
| 2004/0011628 A1 | * | 1/2004 | Koeda et al. ............... | 198/839 |

FOREIGN PATENT DOCUMENTS

| | | |
|---|---|---|
| DE | 32 35 191 A1 | 4/1983 |
| FR | 2 393 745 A1 | 1/1979 |
| FR | 2 674 513 A1 | 10/1992 |
| FR | 2 741 053 A1 | 5/1997 |

* cited by examiner

*Primary Examiner*—James R Bidwell
(74) *Attorney, Agent, or Firm*—Lerner, David, Littenberg, Krumholz & Mentlik, LLP

(57) ABSTRACT

Method for manufacturing a bent curve element and a blank for manufacturing a bent curved metal element for an endless chain conveying track are disclosed. The bent curve element has a support flange intended to constitute a guide rail for a first side of chain elements forming part of the chain conveying track, and a web from which the first flange extends. The web is intended to provide torsional rigidity to the bend element. A bend element is used to make bend unit which in turn is used to make a conveying track.

17 Claims, 16 Drawing Sheets

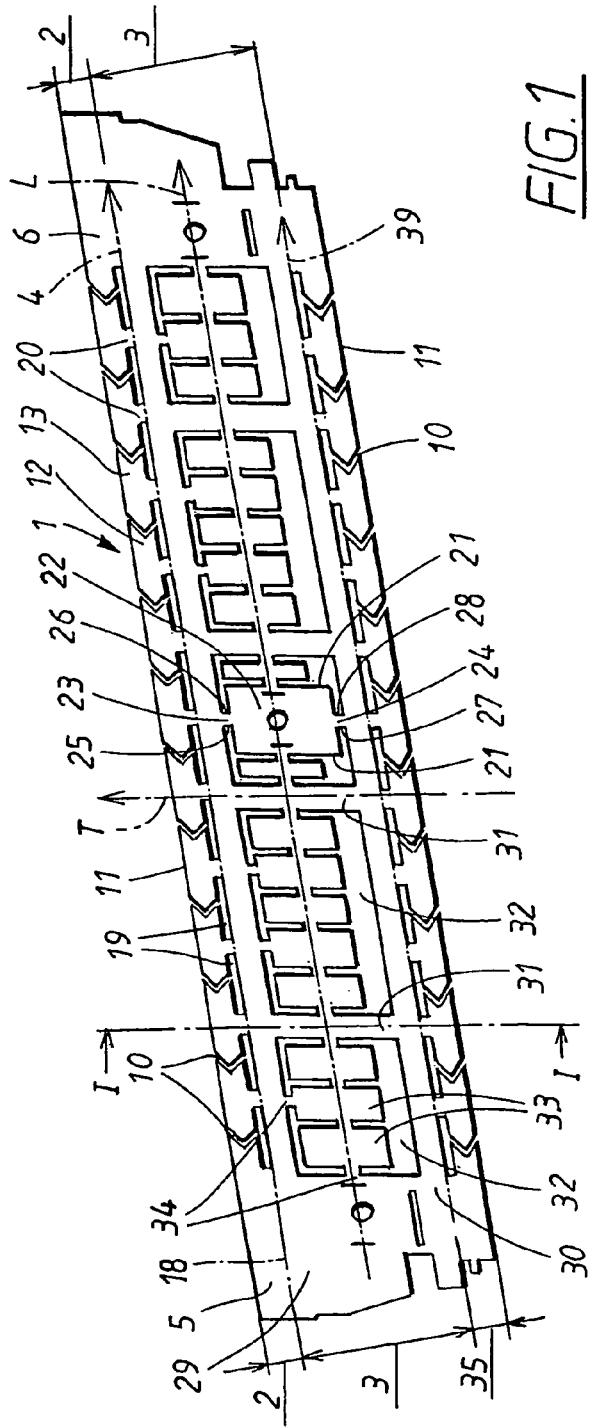
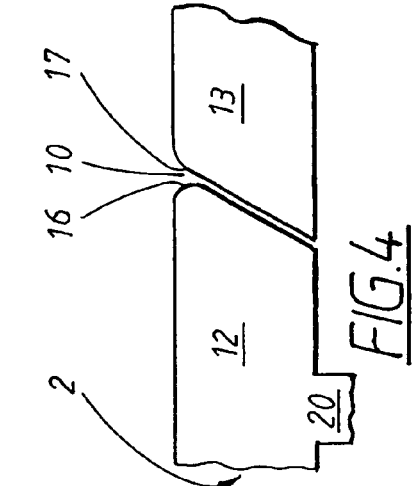
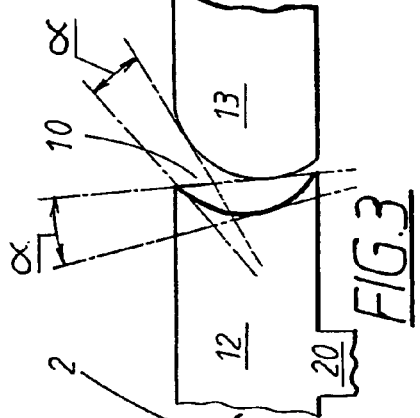
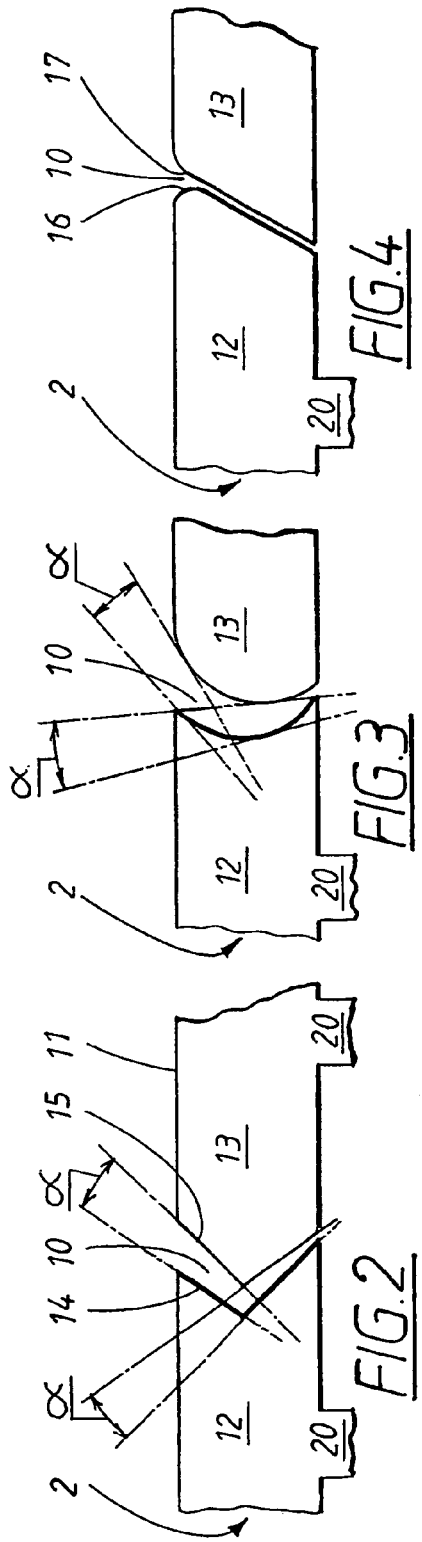

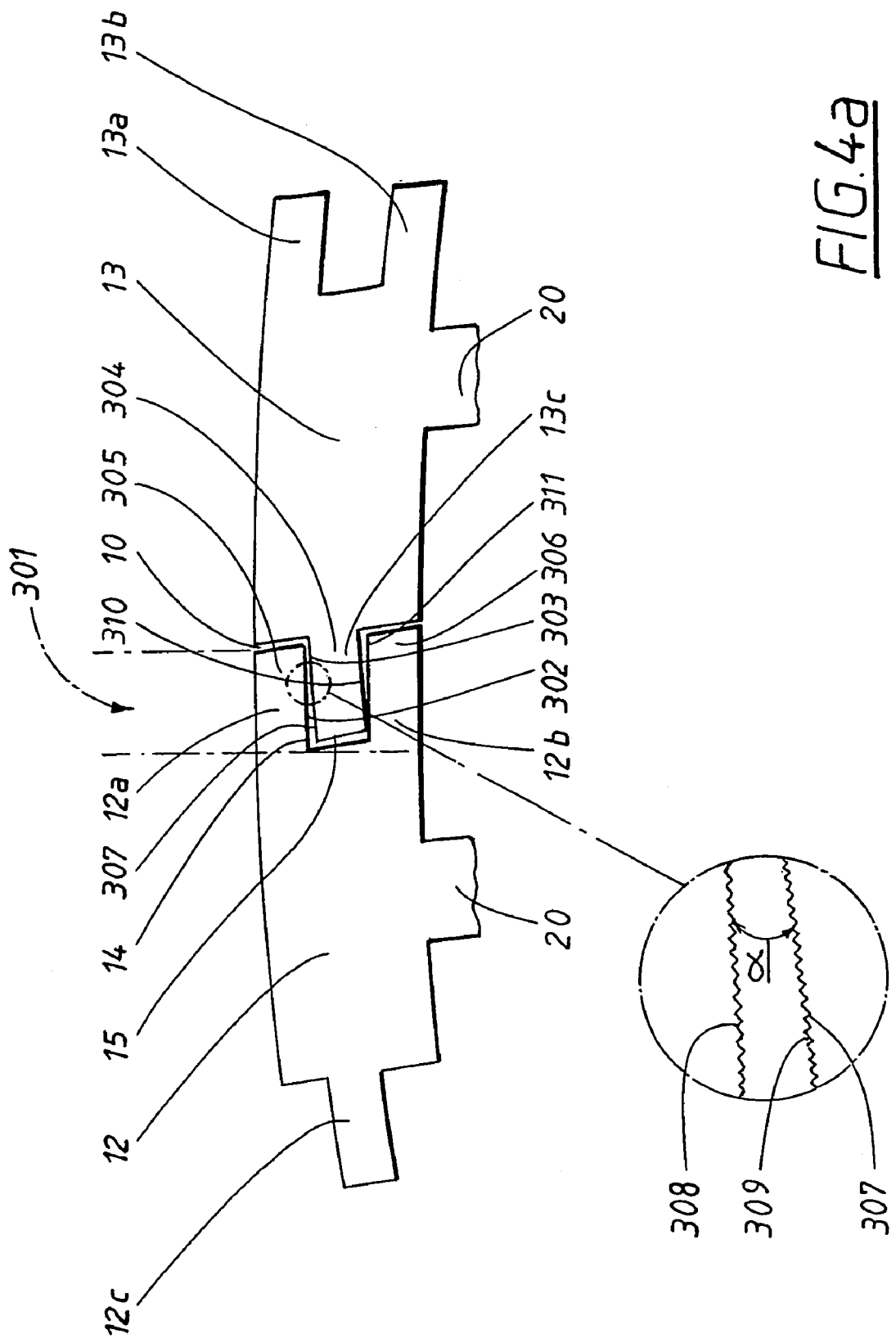

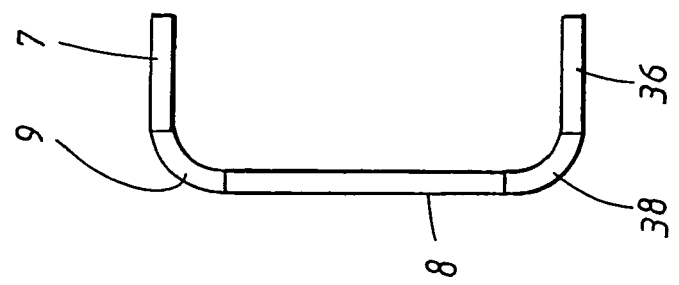
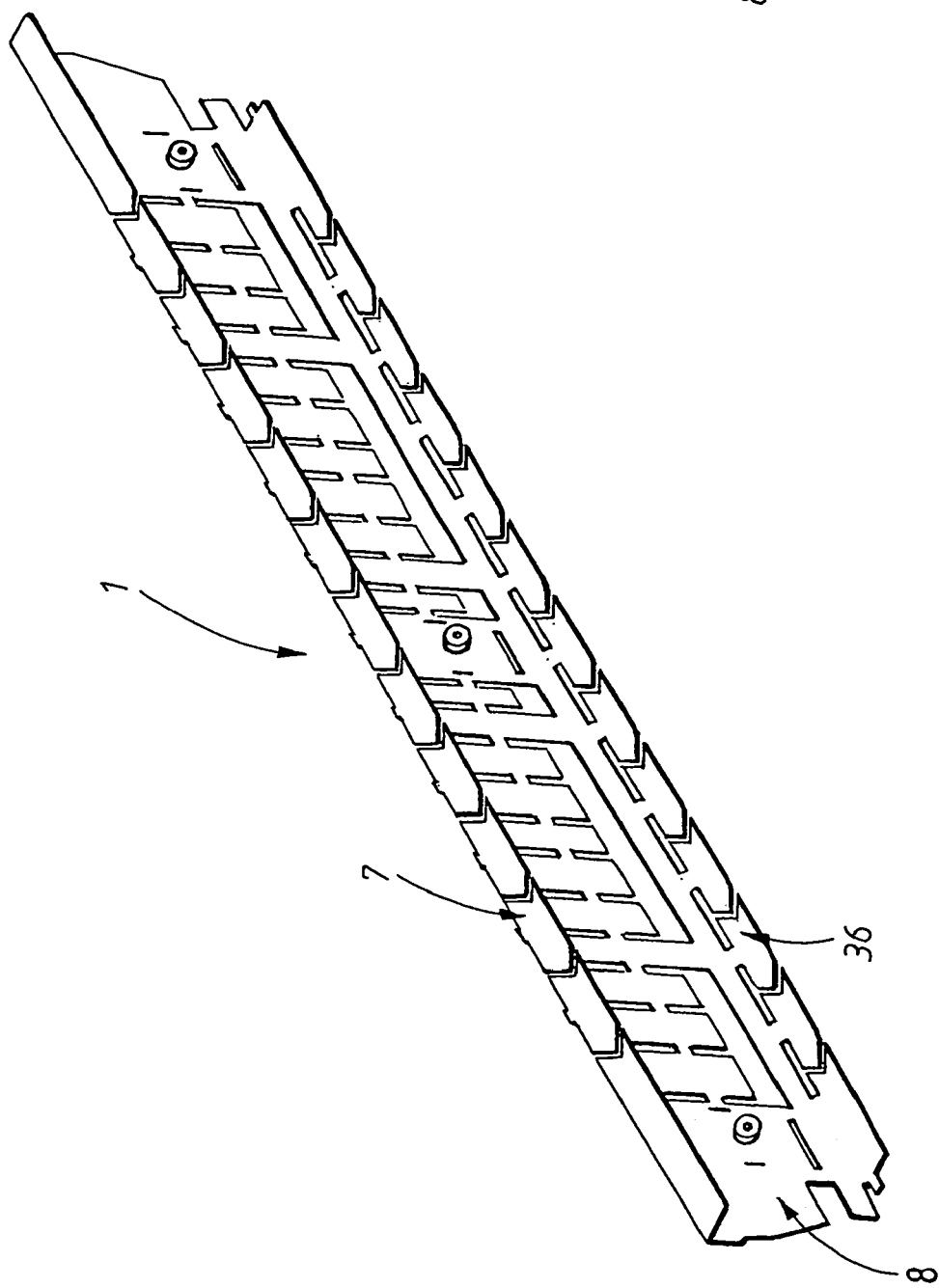

METHOD AND BLANK FOR MANUFACTURING A BENT CURVE ELEMENT, BENT CURVE ELEMENT, CURVE UNIT COMPRISING A BENT CURVE ELEMENT AND ALSO CONVEYING TRACK COMPRISING SUCH A CURVE UNIT

TECHNICAL FIELD

The present patent application relates to a method for manufacturing a bent curve element for an endless chain conveying track which comprises a support flange intended to support a first side of chain elements forming part of the chain conveying track, and a web from which the said flange extends, where said web is intended to provide torsional rigidity in the curve element. The present patent application also relates to a blank for manufacturing a bent curve element for an endless chain conveying track which comprises a support flange intended to constitute a guide rail for a first side of chain elements forming part of the chain conveying track, and a web from which the said flange extends, where the said web is intended to provide torsional rigidity in the curve element. The present patent application also relates to a bent curve element for an endless chain conveying track in which curve element is made from a blank consisting of a plane metal sheet, which has a first end piece which is intended to be shaped into a flange and a central piece which is intended to constitute a web, where said first end piece has a set of slots which run from an edge present on the end piece to the said central piece. The present patent application also relates to a curve unit having a first curve element having a first support surface intended to constitute a guide rail for a first side of chain elements forming part of a chain conveying track, a second curve element having a second support surface intended to constitute a guide rail for a second side of chain elements forming part of the chain conveying track, and a bracket which supports the said first and second support surfaces in a parallel manner to form a curved track, In this application, curve element means an element which is self-supporting and has a support surface intended to constitute a guide rail for one side of chain elements forming part of a chain conveying track. Curve unit means a unit comprising a curved guide element for diverting a chain conveying track from an ingoing direction to an outgoing direction which is angled in relation to the said ingoing direction. The invention relates to a curve unit with two curve elements arranged in a parallel manner and also a bracket which supports these two bend elements.

BACKGROUND ART

In order to make available conveying systems with a two-dimensional or three-dimensional configuration, diverting stations are required for conveying tracks which are otherwise arranged linearly. A common way of bringing about diverting stations is to provide an ingoing and an outgoing linear conveying track, which tracks are partly superimposed within the diverting area. When goods are conveyed along the conveying track, the goods are transferred from the ingoing linear conveying track to the outgoing linear conveying track. In order to bring about the said transfer, it is usually necessary to ensure, by raising or lowering one of the tracks, that the propelling of the goods is transferred from the ingoing to the outgoing linear track. With this type of diverting station, it is difficult to bring about continuous operation through the diverting station, which means that the diverting station can be limiting for the average track speed. Furthermore, in this type of diverting station, use is made of quite a number of active components, which makes this type of diverting station expensive to manufacture. Often included are inter alia motorized lifting units, sensors for monitoring the position of the goods in the diverting station and a control unit for correct control of the conveying track and lifting units depending on the position of the goods in the diverting station.

In order to overcome the abovementioned problems, use is therefore made of curve units comprising a curved guide element for diverting a chain conveying track from an ingoing direction to an outgoing direction which is angled in relation to the said ingoing direction. One way of producing curve units is to use curve elements made from a metal sheet which has been bent into the desired track shape and on which a support flange is firmly welded. The function of the support flange is to constitute a guide rail for a first side of chain elements forming part of the chain conveying track. The curve element is then assembled to form a curve unit by using a second curve element which has a support surface intended to constitute a guide rail for a second side of chain elements forming part of the chain conveying track. The second curve element can be designed in the same way as the first curve element with a mirror-inverted position of the welded-on flange. Alternatively, the second bend element can consist of a rotatably arranged turntable, the periphery of which is arranged so as to constitute a guide rail for one side of a chain in the bend unit. A first disadvantage of this type of bend unit is that extensive welding work is necessary for preparation of the bend unit. Apart from the fact that the welding itself is time-consuming, the weld joint gives rise to pores in the weld metal. In the event that the bend unit is to be used in installations with a high cleanliness requirement, for example in the food industry, the presence of pores can give rise to difficulties in cleaning the apparatus, with the risk of bacteria as a consequence. In order to reduce this risk, the weld joints are usually polished to eliminate the pores. This process step is also time-consuming and therefore makes the end product more expensive.

Another known way of manufacturing bend units is described implicitly by FR 2741053, in which a bend unit with a curved guide track made of plastic is used. A possible manufacturing method is injection moulding or extrusion or alternatively moulding of the track.

Furthermore, a bend unit which has a backbone-shaped guide track which is constructed around a web on which vertebra-shaped projections are formed is described in FR 26 74 513. The guide track is manufactured by moulding plastic in one piece, or alternatively plastic projections being mounted on a web made of metal. This bend unit and other previously known bend units have the disadvantages that they are complicated to manufacture and that delivery has to take place in the assembled state, which can take up a great deal of space.

DISCLOSURE OF INVENTION

One object of the invention is to provide a method for manufacturing a metal curve element, which curve element can be used in a curve unit for a chain conveying track, where the metal curve element can be supplied in an essentially plane state, after which it is curved into the intended shape when mounting takes place without finishing in the form of polishing or welding being necessary.

The method also allows effective use of plane metal sheet in relation to previous methods where a curved flange element is cut out and then welded firmly to a curved web. When curved elements are cut out, great quantities of metal scrap are produced.

An object of the present invention is to provide a method for manufacturing a metal curve element that reduces scrap. By providing a plane metal sheet, which has a first end piece which is intended to be shaped into a support flange and a central piece which is intended to constitute a supporting web, with a set of slots which run from an edge present on the end piece to the said central piece, bending of the sheet around a main axis extending vertically in relation to the said flange is made possible without the flange taking up pressure or tensile stress, which would be the case if the flange were solid. The flange will therefore retain its plane extent in a plane which is arranged essentially at right angles in relation to the said main axis. The curve element is therefore flexible, for which reason bending of the element can take place in connection with mounting without finishing in the form of polishing or welding having to be carried out.

A second object of the invention is to provide a blank for a curve element which is suitable for use in the said method.

A third object of the invention is to provide a curve element which is formed from such a blank.

A fourth object of the invention is to provide a curve unit which includes a curve element according to the invention.

A fifth object of the invention is to provide a conveying track which includes a bend unit according to the invention.

Preferred embodiments are described in the subclaims.

DESCRIPTION OF FIGURES

The invention will be described in greater detail below with reference to accompanying drawing figures, in which:

FIG. 1 shows a blank for forming a bent metal curve element,

FIG. 2 shows slots designed according to a first preferred embodiment for use of the curve element as an outer curve element in a curve unit, FIG. 3 shows slots designed according to an alternative embodiment for use of the curve element as an outer curve element in a curve unit, FIG. 4 shows slots designed according to a first embodiment for use of the curve element as an inner curve element in a curve unit, FIG. 4a shows slots designed according to a second embodiment for use of the curve element as an inner curve element in a curve unit, FIG. 5 shows the blank in FIG. 1 with a bent upper and lower flange, FIG. 6 shows a cross section through the bent blank shown in FIG. 5.

PREFERRED EMBODIMENT(S)

Figure 4B:
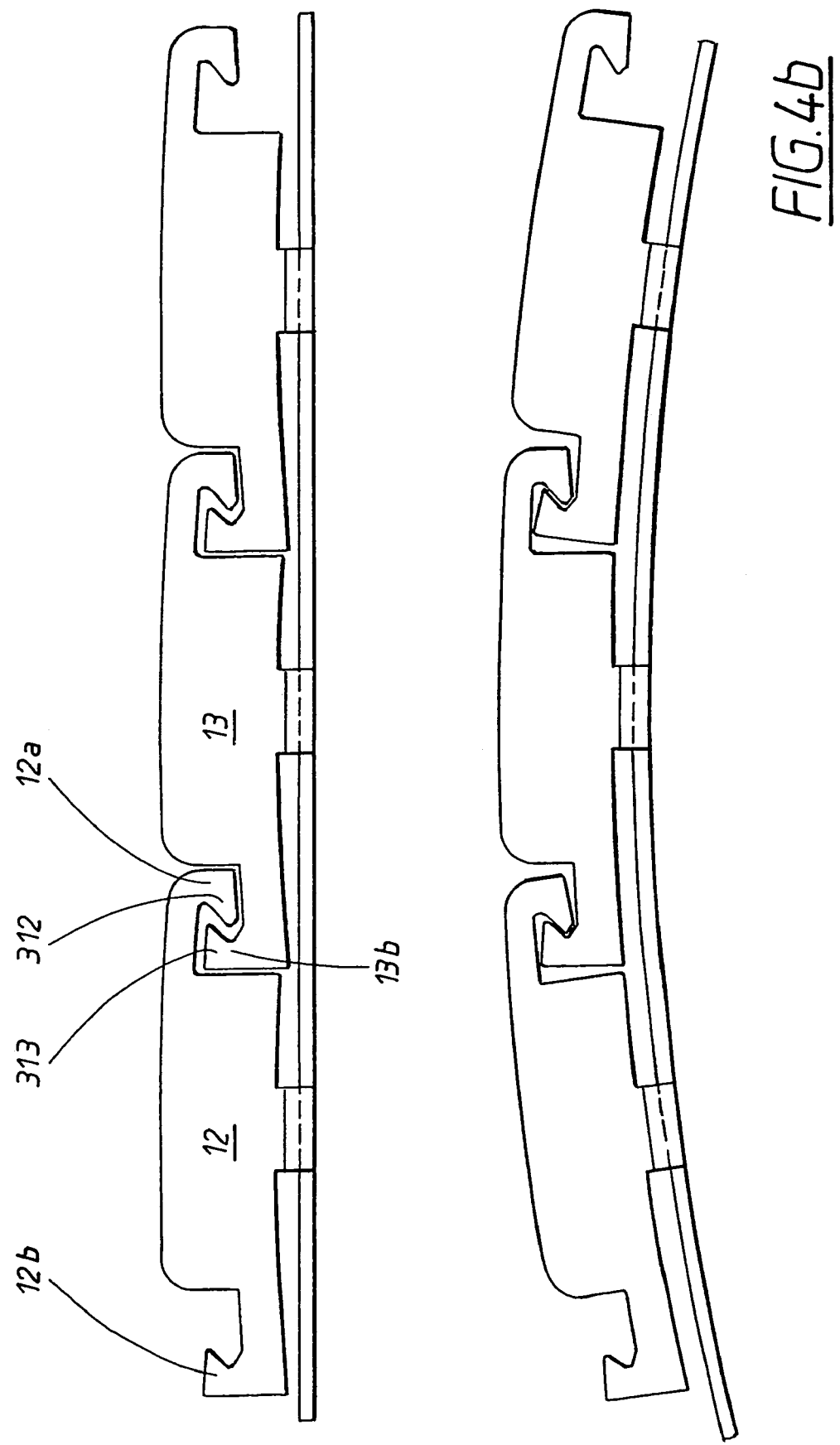
FIG. 4b shows slots designed according to a third embodiment for use of the curve element as an inner curve element in a curve unit.

FIG. 1 shows a blank 1 for manufacturing a bent metal curve element for an endless chain conveying track. The blank 1 consists of a plane metal sheet with a longitudinal direction L and a transverse direction T. The metal sheet has a first end piece 2 and a central piece 3. The first end piece 2 preferably runs along essentially the entire longitudinal direction L of the metal sheet, but can be discontinued at its ends 5, 6 in the event that the flange 7, which is formed when the end piece 2 is bent along a bending axis 4 which runs between the end piece 2 and the central piece 3, is not to extend along the entire length of the sheet.

The end piece 2 has a set of slots 10 which run from an edge 11 of the end piece 2 up to the central piece 3. FIG. 2 shows a slot 10 designed according to a first preferred embodiment for use as an outer bend element in a bend unit. The slot 10 runs from an edge 11 of the end piece 2 up to the central piece 3. In the example shown, the slot 10 diverges continuously towards the edge 11 with an opening angle α. In the example shown, the slot forms a V-shaped cut for guiding consecutive flange elements 12, 13 in towards one another after bending of the end piece 2 into a flange 7. FIG. 2 shows that the opening angle is the same along both legs of the V-shaped cut. By virtue of the fact that the slots 10 widen essentially continuously in the direction towards the edge 11, opposite end surfaces 14, 15 present in the slot 10 form support surfaces when bending takes place, which run along essentially the entire length of each slot 10. FIG. 3 shows an alternative embodiment of a slot 10 where the slot 10 forms a U-shaped cut for guiding consecutive flange elements 12, 13 in towards one another after bending of the end piece 2 into a flange 7. Other shapes such as S-shaped or W-shaped slots can of course be used. The support surfaces 14, 15 ensure that the correct radius of curvature is obtained when an outer curved metal bend element is formed. A slot 10 which does not diverge continuously may give rise to point loading when curving takes place. It is therefore advantageous but not necessary to design the slots so as to diverge continuously with a constant opening angle.

FIG. 4 shows a slot 10 in a blank for use as an inner curve element in a curve unit. In this case, the slot is advantageously formed without an opening angle, the end surfaces 14, 15 essentially bearing against one another before bending. In this case, the flange elements 12, 13 are preferably designed with rounded outer corners 16, 17, which reduces the risk of irregularities in the guide rail the end piece is to form after fashioning into a flange 7. By virtue of the fact that the end surfaces 14, 15 lie as close to one another as possible before the blank 1 is curved to form a bend element, minimal clearance arises between the consecutive flange elements 12, 13 after curving.

In order to facilitate bending of the blank 1 along a bending axis 4 which runs between the end piece 2 and the central piece 3, the blank 1 is designed with a fold indication 18 (FIG. 1) along this axis 4. The fold indication 18 is preferably designed as a discontinuous slit 19 running along the bending axis 4. The discontinuous slit 19 is interrupted by web elements 20 which connect the flange elements 12, 13 of the flange 7 to the central piece 3. The slots 10 run up to the said discontinuous slit 19. At least one web element 20 is located between each pair of slots 10 for bearing a respective flange element 12, 13.

In the embodiment shown in FIG. 1, the central piece 3 is furthermore designed with cutouts 21 in pairs, which together delimit a fastening plate 22. The fastening plate 22 is connected to the material of the central piece 3 via an upper and a lower, second web element 23, 24, which elements are positioned where the ends 25-28 of the said cutouts 21 in pairs meet. The extent of the upper and the lower web elements 23, 24 in the longitudinal direction L of the blank is considerably smaller than the extent of the fastening plate at its widest part. This results in only a fraction of the bending torque being transmitted when the blank is curved, the fastening plate 22 remaining essentially plane after bending. The upper and the lower web elements 23, 24 are positioned essentially vertically in relation to one another. This too contributes to minimizing the torque transmitted.

The embodiment as shown in FIG. 1 furthermore comprises a central piece 3 which has an upper and a lower longitudinal band-shaped structure 29, 30, which structures are connected by crosspieces 31. A partly open area 32 is formed between the crosspieces 31. The openness contributes to the finished bend unit being easy to clean. In order to prevent risk of pinching, these openings 32 are partly covered by cover elements 33 which are connected to at least one of the said longitudinal band-shaped structures 29, 30 and/or the said crosspieces 31 by a set of third web elements 34. This construction means that the cover elements 33 do not contribute greatly to the torsional rigidity of the blank 1 around an axis of rotation parallel to the transverse direction T, it being possible for the torsional rigidity around an axis of rotation parallel to the transverse direction T to be designed more homogeneously along the longitudinal axis L. Homogeneous torsional rigidity contributes to the radius of curvature being the same along the entire bend element.

The embodiment shown in FIG. 1 also has a second end piece 35 which is intended to form a second flange.

FIG. 4a shows slots 10 designed according to a second embodiment for use of the bend element as an inner bend element in a bend unit. The slot 10 forms projections 12a, 12b, 13c located on consecutively following flange elements 12, 13 separated by the slot 10. The projections 12a, 12b, 13c engage in one another by virtue of the slot forming an overlapping area 301, whereat opposite end surfaces 302, 303 present in the slot being arranged so as to bear against one another after rotation around the second axis of rotation 41.

The projections 12a, 12b, 13c shown in FIG. 4a are designed as a pin-shaped projection 304 on a first flange element 13, which extends essentially in the longitudinal direction of the flange 7 between projections 305, 306 on a second, consecutively following flange element 12, which extend on either side of the pin-shaped projection 304. According to a preferred embodiment, on an upper surface 307 of the pin-shaped projection facing away from the web 3, the slot 10 diverges continuously with an opening angle α in the direction towards the following flange element 12, which is shown in the inset enlargement. In this way, the upper surface 307 of the pin-shaped projection will, after bending, bear against the inner surface 308 of the outer projection 305 of the following flange element 12, which surfaces thus form support surfaces for bringing about controlled bending of the blank.

The upper surface 307 and the inner surface 308 can have a toothing 309 in order to bring about increased friction when bending takes place and in this way better control of the curving operation.

In the same way, on a lower surface 310 of the pin-shaped projection facing towards the web 3, the slot 10 diverges continuously with an opening angle α in the direction away from the following flange element 12. In this way, the lower surface 310 of the pin-shaped projection will, after curving, bear against the outer surface 311 of the inner projection 306 of the following flange element 12, which surfaces thus form support surfaces for bringing about controlled curving of the blank.

In FIG. 4b, the slot forms hook-shaped projections 12a, 13a which engage in one another after rotation around the second axis of rotation 41.

FIG. 5 shows the blank in FIG. 1 with a bent upper flange 7 and lower flange 36 in a perspective illustration. FIG. 6 shows a cross section through the bent blank shown in FIG. 5. The figures show an upper and a lower flange 7, 36, which flanges are formed by the first and, respectively, the second end piece 2, 35. The upper and lower flanges 7, 36 are borne by a web 8 formed by the central piece 3. The flanges 7, 36 are connected to the web 8 via a first and a second transition area 9, 38. The transition areas are formed in the boundary between the central piece 3 and the end areas 2, 35. In the embodiment shown, the transition area consists of the webs 20.

Figure 7:
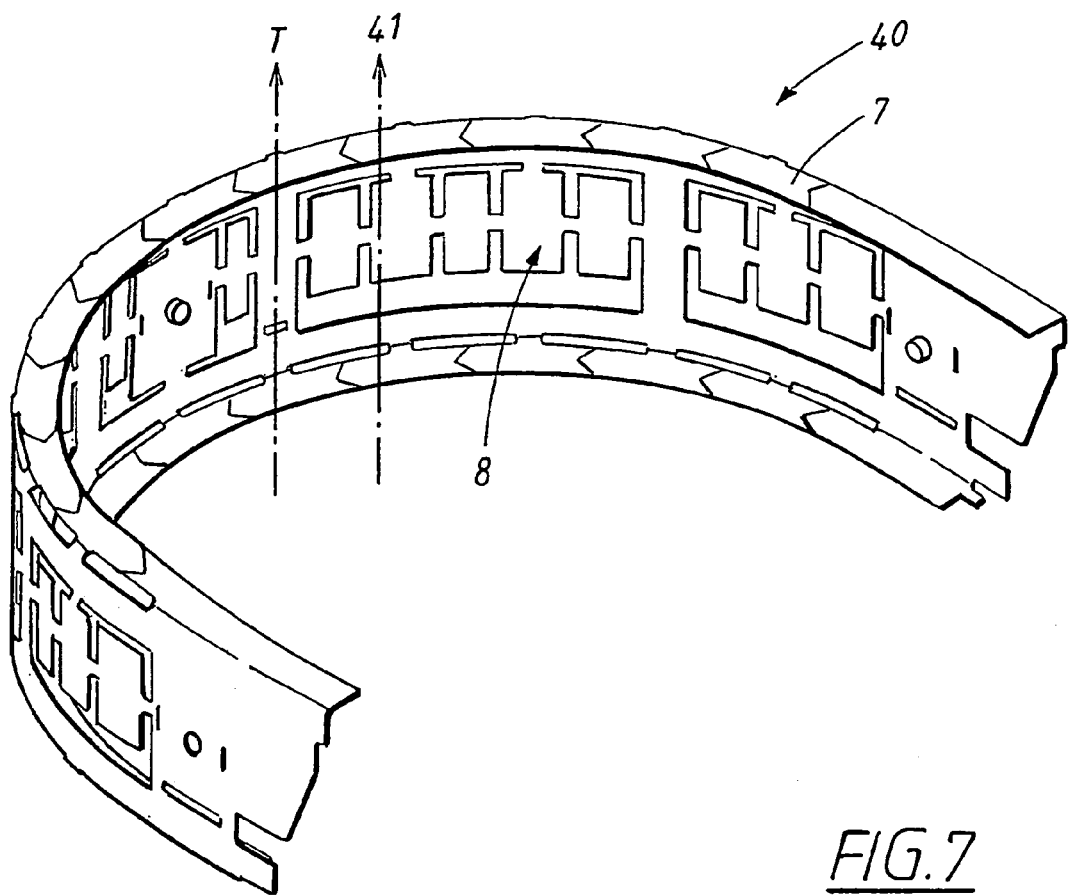
FIG. 7 shows a curved metal curve element formed from the bent blank in FIG. 5 by bending around a main axis which runs vertically in relation to the longitudinal direction of the blank.

FIG. 7 shows a bent metal curve element 40 which is made from a blank 1 as described above. The curve element 40 comprises a web 8 which bears a first, upper projecting flange 7 and where appropriate a second, lower projecting flange 36. The curve element is bent around a main axis 41 which is arranged parallel to the transverse direction T of the blank 1. In the example shown, the flanges are directed in towards the centre of curvature of the curve element 40, which means that the curve element is arranged so as to serve as an outer curve element in a curve unit.

Figure 8:
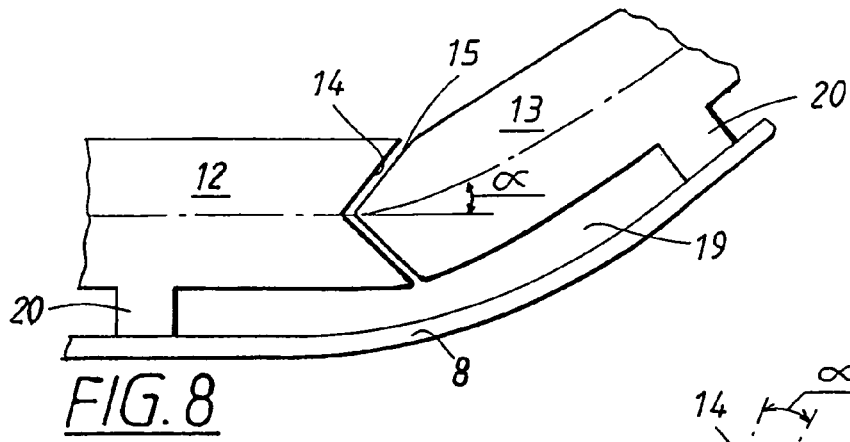
FIG. 8 shows a view from above of an outer bend element.

FIG. 8 shows a view from above of an outer curve element 40. The figure shows that the support surfaces 14, 15 essentially bear against one another and that two consecutive flange elements 12, 13 are angled at an angle α corresponding to the previous continuous opening angle in the slot 10. The figure also shows how the flange elements 12, 13 are joined to the web 8 via bent webs 20 and also the discontinuous slit 19 running between the webs 20.

Figure 9:
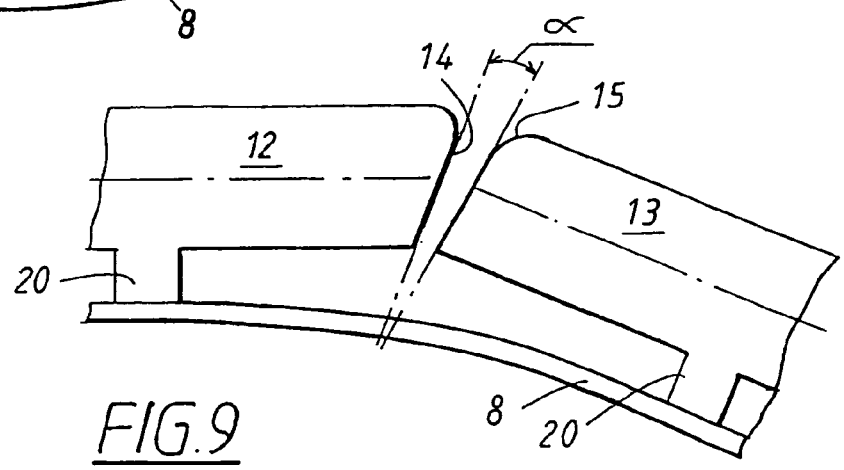
FIG. 9 shows a view from above of an inner bend element.

FIG. 9 shows a view from above of an inner curve element 40. The figure shows that the support surfaces 14, 15 have diverged from one another and now have an opening angle α instead of essentially bearing against one another as before curving. The figure also shows that two consecutive flange elements 12, 13 are angled at an angle α corresponding to the current opening angle α. The figure also shows how the flange elements 12, 13 are joined to the web 8 via curved webs 20 and also the discontinuous slit 19 running between the webs 20.

Figure 10:
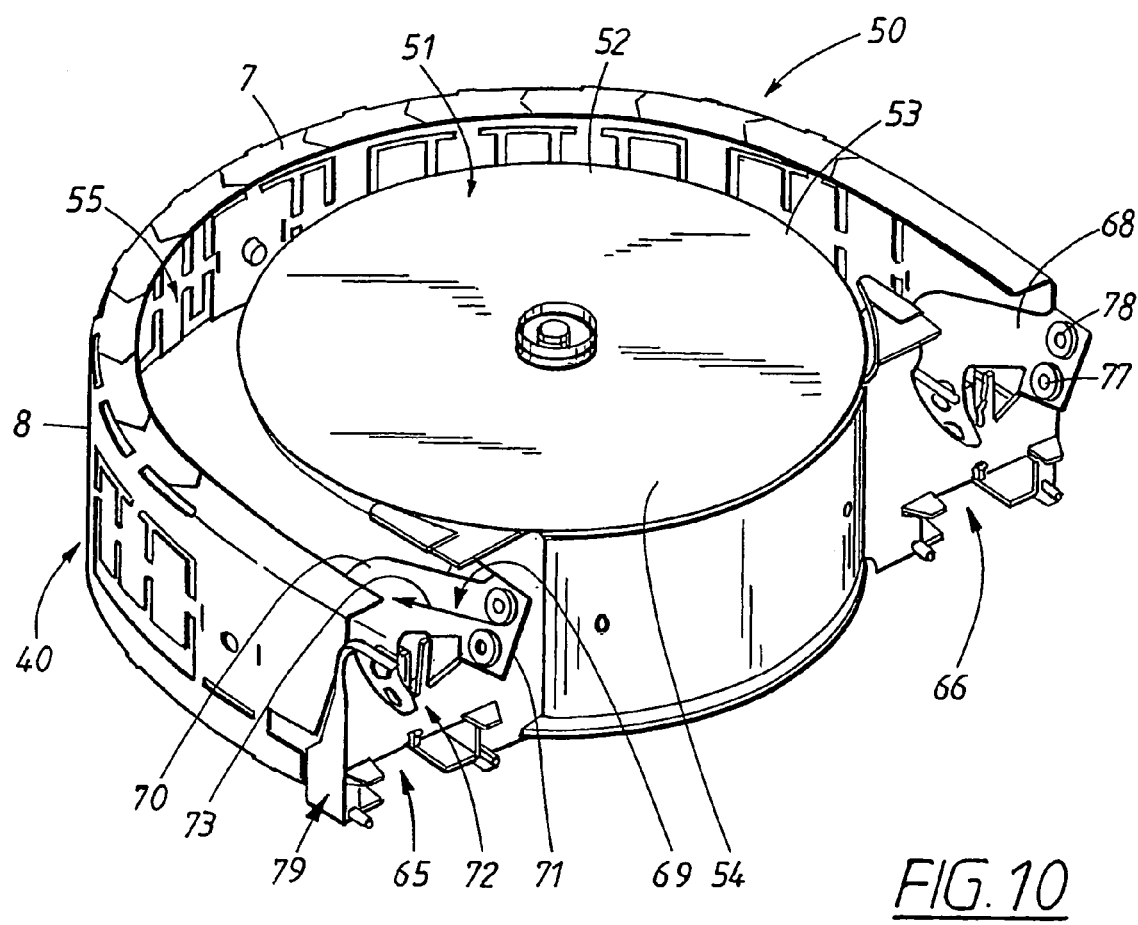
FIG. 10 shows a view from above of a curve unit having a first bent outer metal curve element.
Figure 11:
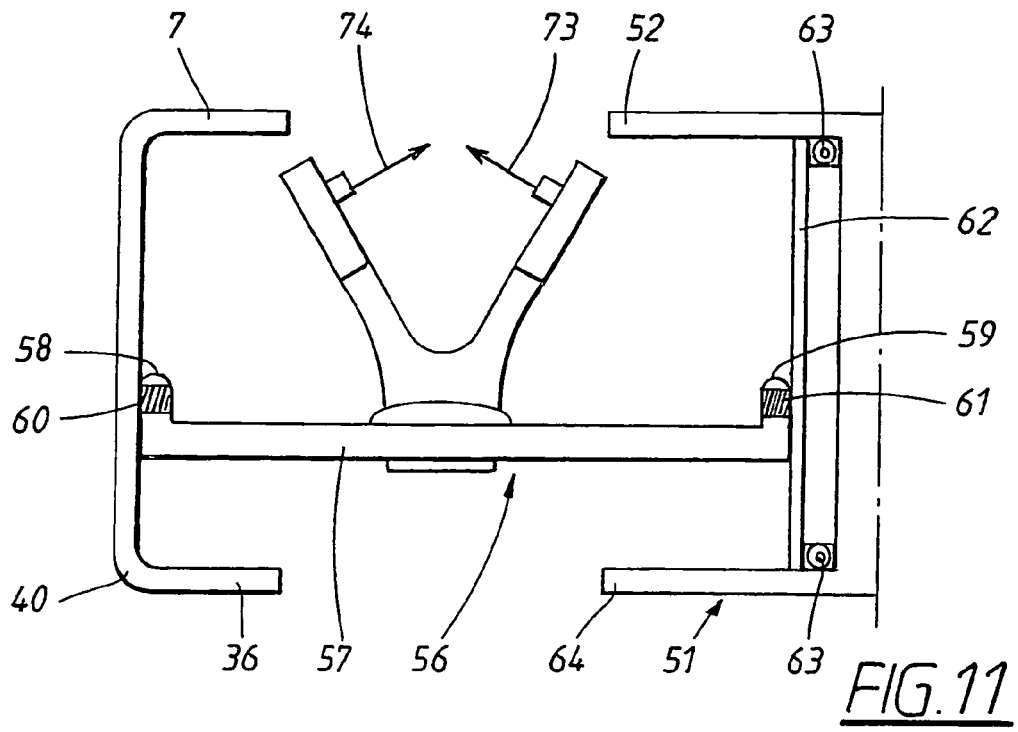
FIG. 11 shows a section through the curve unit.
Figure 12:
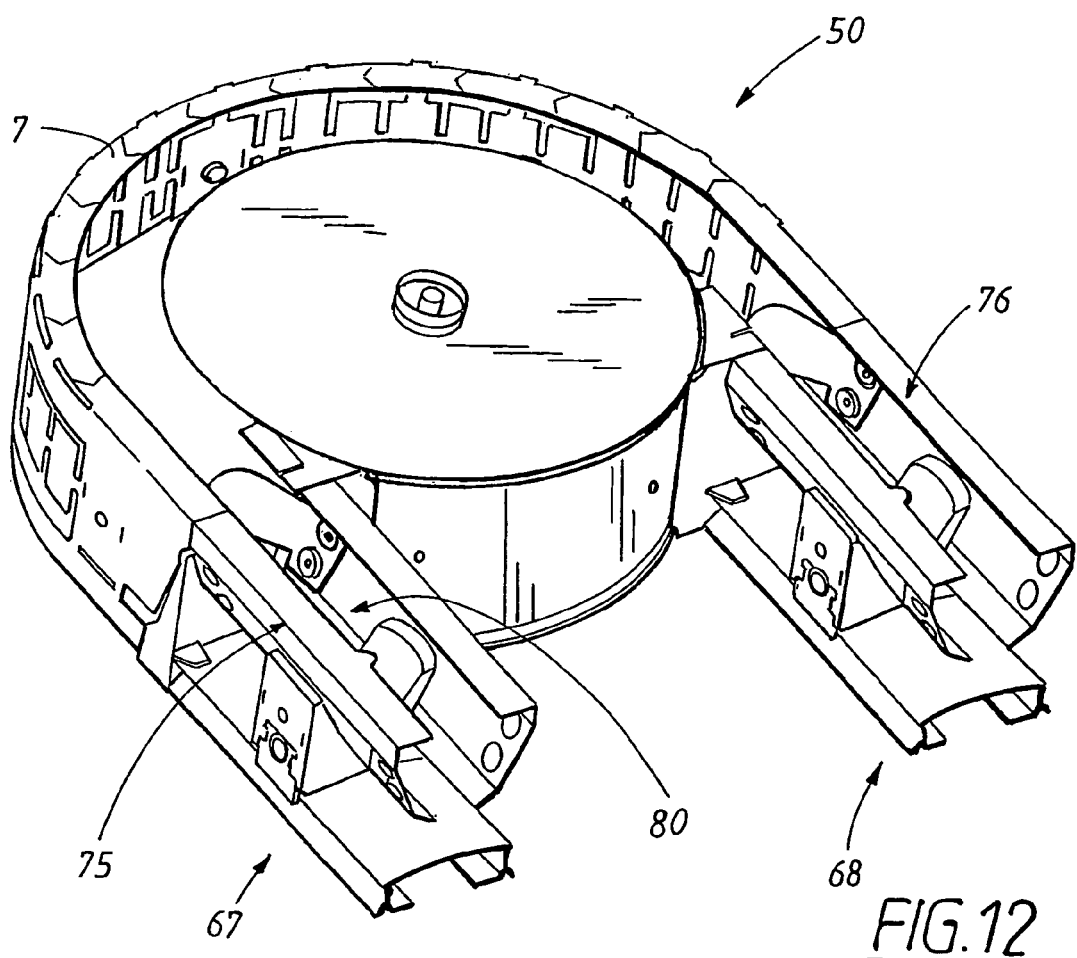
FIG. 12 shows a curve unit with ingoing and outgoing linear units mounted on, FIG. 13 shows a first side of an adapter unit intended to be mounted between a linear ingoing or outgoing unit and the curve unit.

The curve unit will be described in greater detail in connection with FIGS. 10, 11 and 12. FIG. 10 shows a view from above of a curve unit 50 having a first, outer curve element 40. FIG. 11 shows a section through the curve unit. FIG. 12 shows a curve unit with ingoing and outgoing linear units mounted on.

In the embodiment shown, the curve element 40 is designed according to what was shown in FIG. 7. The curve unit 50 also comprises a second curve element 51 which has a second support surface 52 intended to constitute a guide rail 53 for a second side of chain elements forming part of the chain conveying track. In the embodiment shown, the second curve element is designed as a rotatably suspended disc 54, said second support surface 52 being arranged rotatably. The first, outer curve element has a curved web 8 which constitutes a part of the lateral surface of a cylinder and, at its upper and lower end in relation to the axis of curvature of the web, bears a first, upper flange 7 and a second, lower flange 36, which flanges are directed radially inwards. The support surface present on the disc 54 is arranged in a plane which runs through the said upper flange 7. The flange 7 of the first, outer bend element 40 and the support surface 52 of the second, inner bend element 51 form a curved track 55 which is intended to support and guide a conveying chain (not shown). The outer curve element 40 and the inner curve element 51 are supported by a bracket 56 which consists of a plate 57 in the embodiment shown. According to a preferred embodiment, the plate 57 has bent-up projections 58, 59 which have threads 60, 61 for attachment to the first and the second bend element 40, 51. According to a preferred embodiment, the rotatably suspended disc 54 of the second curve element 51 is suspended rotatably in a sleeve 62 which is supported by the said bracket 56. The disc can preferably be mounted by means of roller or sliding bearings 63. In the embodiment shown, the curve unit 50 bears a second rotatably arranged disc 64 which is arranged so as to interact with the lower flange 36 of the outer curve element 40.

The curve unit 50 also bears docking means 65, 66 intended to be coupled together with ingoing and, respectively, outgoing linear units 67, 68 (FIG. 12). The docking means 65, 66 have bracket elements 68, 69 which are supported by the stand 56. In the illustrative embodiment shown, the bracket elements consist of a fork-shaped sheet-metal piece which has a first end which is attached to the bracket 56 and a second end which consists of two flange elements 71, 72 which run essentially parallel to the tangent of the track 55 at the transition to the linear units 67, 68. The flange elements 71, 72 are inclined in relation to one another and have surface normals 73, 74 which are directed towards one another, a support for a beam element 75, 76 having an essentially V-shaped cross section being formed. The flange elements 71, 72 have a set of cupped recesses 77 which are intended to fit against lead-throughs in the beam elements 75, 76. The lead-throughs of the beam elements have a larger diameter than corresponding lead-throughs 78 of the cupped recesses 77. When assembly is carried out, a conical guiding-in of the beam web in relation to the cup-shaped recesses takes place, bringing about fixing. An adapter element 79 is arranged between the beam elements and the first, outer curve element 40 and the second, inner curve element 51 of the curve unit 50. The adapter element links the tracks 80 of the linear units 67, 68 together with the track 55 of the curve unit 50.

Figure 10A:
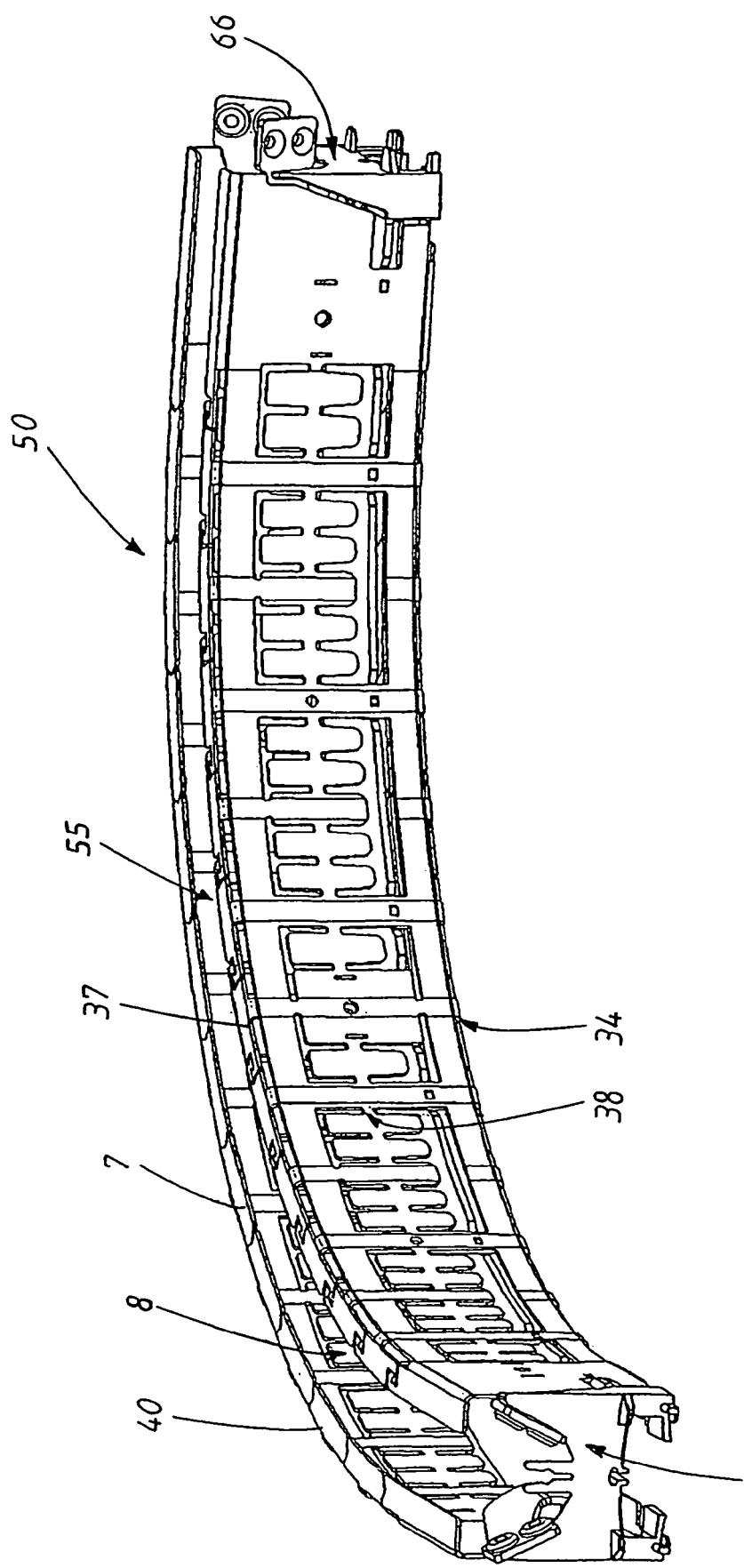
FIG. 10a shows a perspective view of a curve unit comprising an inner and an outer curve element manufactured according to the invention.

FIG. 10a shows a perspective view of a bend unit comprising an inner and an outer curve element manufactured according to the invention. The outer curve element 40 consists of a bent metal curve element as described above in connection with FIG. 7. The curve element 40 therefore has a first support flange 7 which extends from a web 8 of the bent metal curve element 40.

There is also a parallel-mounted second curve element 34 which comprises a second support flange 37 intended to constitute a guide rail for a second side 211d of chain elements 211 forming part of the chain conveying track, and also a second web 38 from which the said second support flange 37 extends, where the said second support flange 37 has a set of slots 10 which run from an edge 11 present on the second flange to the said second web. The first curve element 40 has a convexly curved web with the said first flange 7 facing towards a centre of curvature of the said first web. The second curve element 34 has a web 38 which is mounted parallel to the said first web 8 and also a second flange 37 which faces towards the first flange 7, the said first and second flanges forming a track 55 for chain elements forming part of the said chain conveying track. The curve unit 50 also has an adapter unit 79 mounted on each end. The adapter unit is described in greater detail below. The curve unit also comprises docking means 65, 66.

Figure 13:
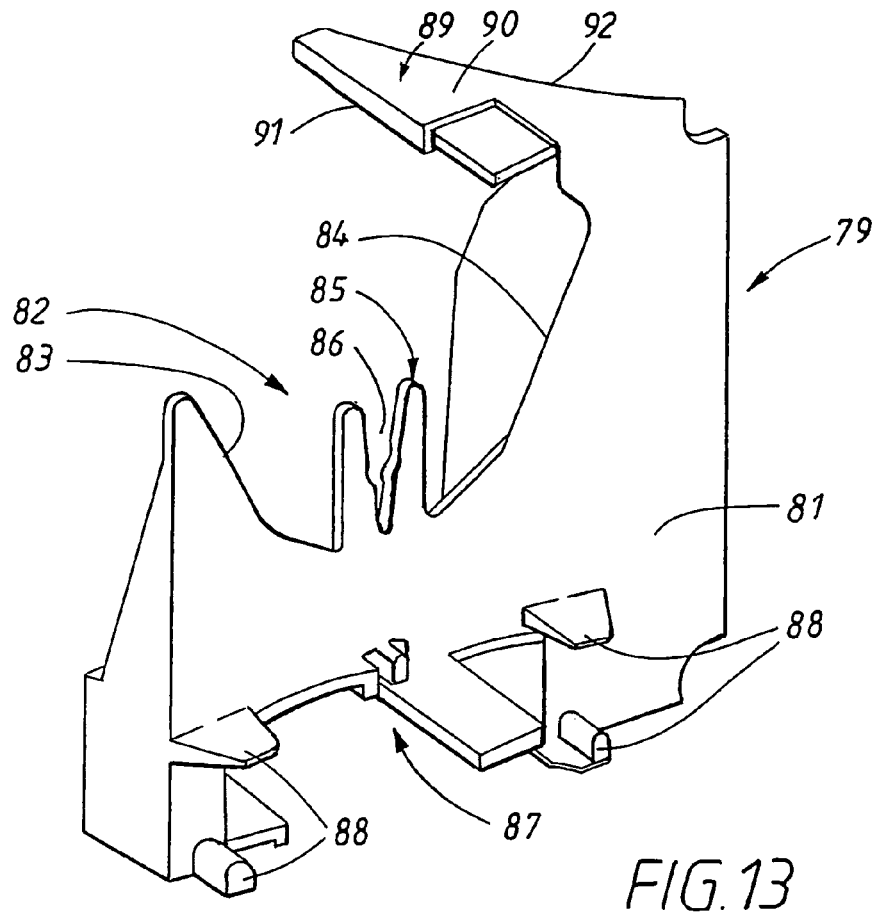
Figure 16:
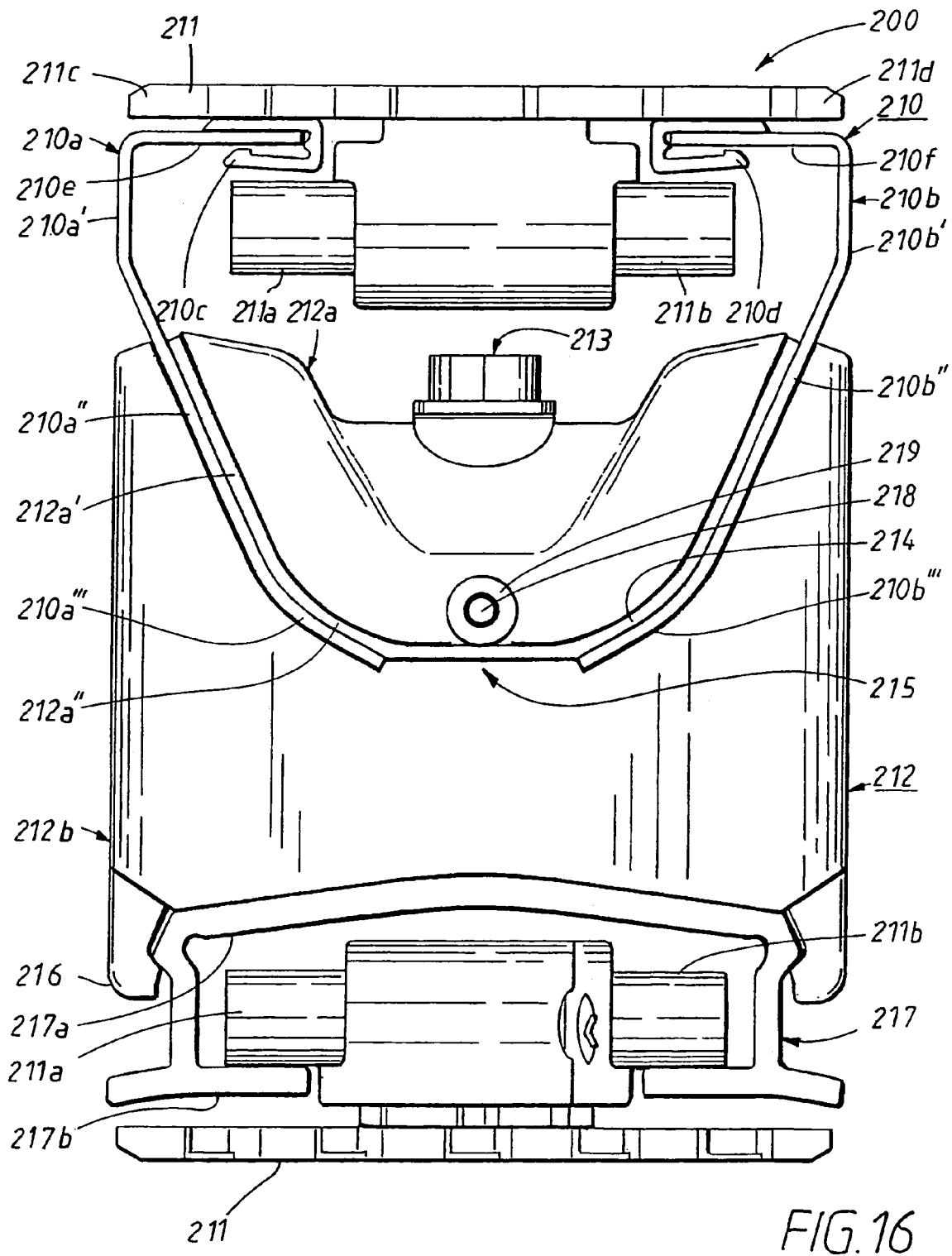
FIG. 16 shows a diagrammatic illustration which at the top shows the conveyor guide for guiding the conveyor chain in the working direction and at the bottom shows the guide for the return direction. The figure also shows in principle the securing arrangement present between the said guides/beams for the beam sides which form part of the guide device acting in the working direction.
Figure 17:
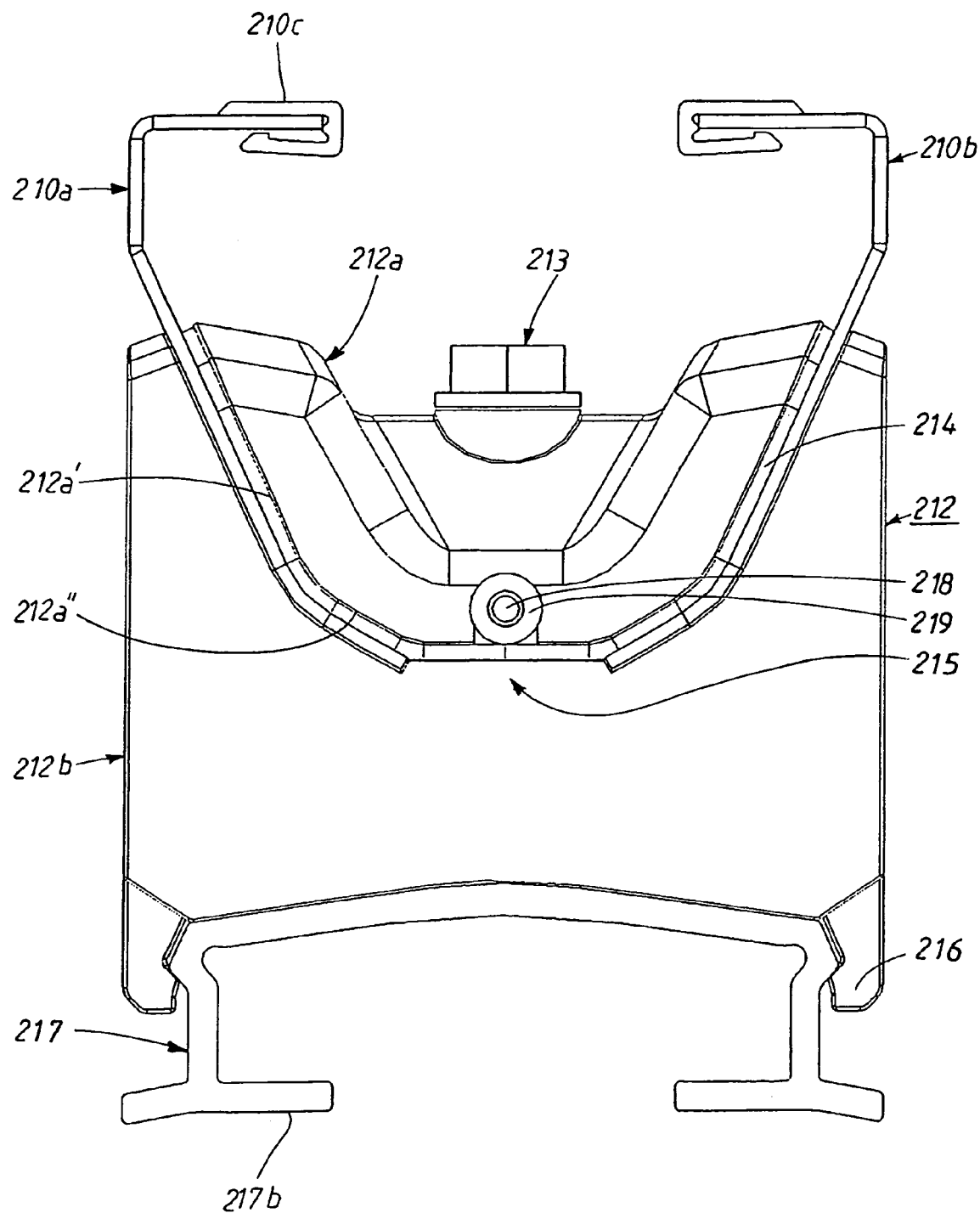
FIG. 17 shows the arrangement in FIG. 16 more clearly, but without conveyor chain links.

FIG. 13 shows the adapter unit 79 in detail. The adapter unit 79 has a first essentially plane surface 81 which is intended to be mounted against a linear unit 67, 68. Arranged in the plane surface 81 is an essentially W-shaped cutout 82, the outer flanks 83, 84 of which are intended to be connected to a beam element 75, 76. The central portion in the W-shaped cutout consists of a projection 85 having a slot 86 arranged for receiving and fixing an elongate element 219 (FIGS. 16, 17). The first plane surface 81 has on its opposite side a second, essentially rectangular cutout 87. Arranged around the rectangular cutout 87 is a set of projections 88 which are arranged so as to be connected to a guide device 217 for a return track.

Figure 14:
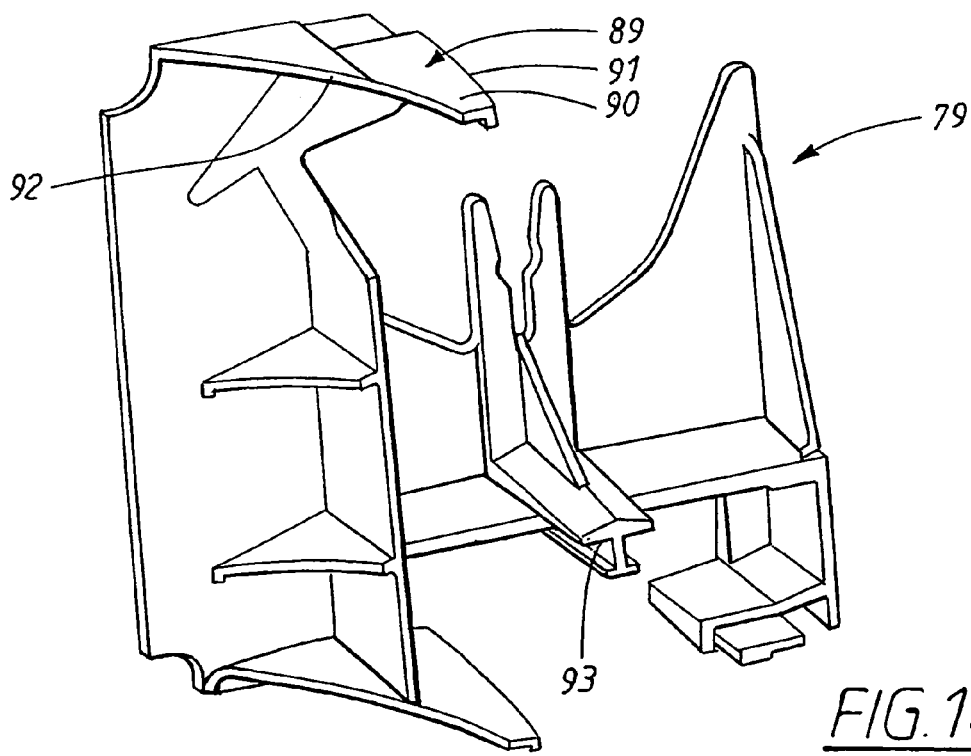
FIG. 14 shows a second side of an adapter unit intended to be mounted between a linear ingoing or outgoing unit and the curve unit.

FIG. 14 shows the opposite side of the adapter unit, which is intended to be mounted inside against the curve unit 50. On this side, the adapter unit has a projection 89 which is intended to constitute the continuation of an ingoing or outgoing track 80 in towards the second, inner curve element 51. For this reason, the projection 89 has a support surface 90 which is formed in the same plane as the support surface 52 of the second, inner curve element. The support surface 90 is formed between a first, linear edge portion 91 and a second, curved edge portion 92. The curved edge portion 92 is intended to lie adjacent to the rotatably suspended disc 54. A second projection 93 is formed on the side facing towards the bend unit. This projection is intended to be fitted into a corresponding recess in the bracket 56 of the curve unit. The projection 93 is designed to be somewhat smaller than the corresponding recess, which means that the adapter unit is attached with some play. The adapter unit is fixed, however, when the linear units are mounted. This play gives rise to a certain tolerance when assembly takes place.

Figure 15:
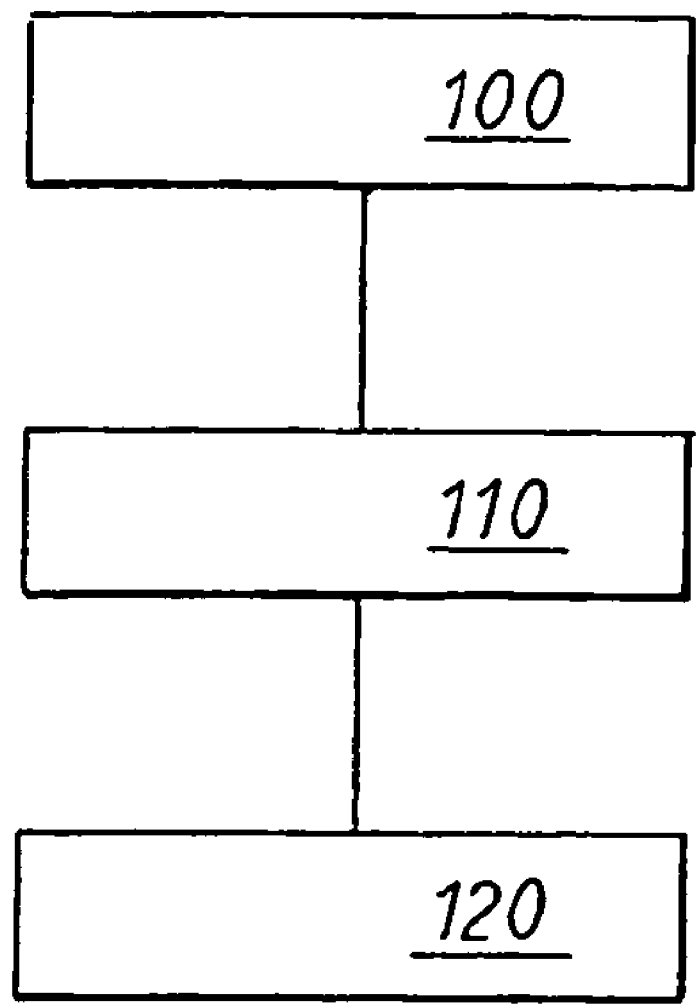
FIG. 15 shows diagrammatically a method for manufacturing a bent metal curve element.

FIG. 15 shows diagrammatically a method for manufacturing a curved metal bend element 40. In a first process step 100, a blank 1 is provided, which consists of a plane metal sheet which is provided with slots 10 in one or both end piece(s) 2, 35 for forming flanges 7, 36. In the event that the curve element 40 is to constitute an outer curve element, the slots 10 are preferably shaped so as to diverge continuously whereas, in the event that the curve element 40 is to constitute an inner curve element, the slots 10 are preferably shaped so that end surfaces 14, 15 present in the slots essentially touch one another. Furthermore, where appropriate, a fold indication 18 is included for each end piece 2, 35 for forming the flanges 7, 36. The fold indications 18 can preferably be designed as longitudinal slits 19 which are interrupted by web elements 20 which bear flange elements 12, 13. Moreover, cutouts can be included to form open areas 32 and also to form fastening plates 22. The said slots, slits and openings are suitably formed by laser-machining the metal sheet, but can also be produced by punching the metal sheet.

In a second process step 110, the first end piece 2 is bent along a first axis of rotation 4 which runs along the said first end piece, and, where appropriate, the second end piece 35 is also bent along a second axis of rotation 39, to form a first flange 7 and, where appropriate, a second flange 36 as well. The bending is suitably carried out using a sheet-metal press.

In a third process step 120, the finished curve element is formed by bending the said web around a second axis of rotation 41 which runs parallel to the plane of the web and vertically in relation to the said first axis of rotation 4, 39, the said slots 10 being opened or closed depending on the direction of rotation. In an advantageous embodiment, the slots 10 have end surfaces 14, 15 which are designed so as to form support surfaces against one another when bending around the said second axis of rotation 41 takes place, an intended curvature along the entire length of the metal sheet being obtained.

Owing to the presence of the slots 10, a relatively low moment is required in order to bring about bending around the second axis of rotation 41. This means that the bending can be effected by manual power. In the event that an outer curve element is being formed, support surfaces 14, 15 formed on the slots will be applied against one another during the bending. The design of the slots therefore determines the local radius of curvature along the longitudinal axis of the blank. This means that it is possible to achieve good shape reproduction by bending by hand. In an especially preferred embodiment, the slots 10 of the blank 1 widen in the direction towards the edge 11 of the blank with a continuous opening angle, which means that the end surfaces 14, 15 bear against one another along their entire length in the final stage of bending.

FIGS. 16-21 show diagrammatically a conveying device where a curve unit according to the above description can be used as an intermediate station. A conveyor for light goods, for example food products packed in consumer packs, will therefore be described below, comprising an endless conveyor chain 211, a bearing first guide device 210 for guiding the conveyor chain in a working direction with goods on the conveyor chain intended for positioning, a second guide device 217 for guiding the conveyor chain in the return direction, and a guide wheel device 220 at both ends of the first and second guide devices, where a curve unit 50 as described above is used. In a preferred embodiment, the bearing guide device comprises a pair of parallel elongate plate-shaped elements serving as beam sides 210a, 210b. The beam sides form a space between them which, at least partly, tapers in the direction towards the second guide device 217. Furthermore, at least one first element 212a with exterior shaping corresponding to the said tapering space bears directly or indirectly against the inside surfaces of the beam sides 210a, 210b, and at least one second element 212b surrounds the said first element 212a at least partly in a shape-adapted manner and, between it and the first element, receives the pair of beam sides 210a, 210b. Moreover, a fastening element 213 is arranged essentially at right angles to the plane bearing the conveyor chain of the first guide device in order to clamp the first and second elements 212a, 212b together and secure the beam sides 210a, 210b located in between.

FIG. 16 shows in principle a section of the construction of an endless chain conveying track 200 comprising the working track and the return track in a conveyor provided with an endless conveyor chain consisting of chain links.

Beam sides 210a, 210b, made of stainless steel in the illustrative embodiment shown and of a given standardized length or a length tailored to a given application, constitute the bearing parts in a guide device 210 for the loadable, working part of the conveyor, that is to say the part on which the goods, for example food products, for example milk, packed in consumer packs, are conveyed.

Chain links 211 forming an endless conveyor lie on sliding strips 210c, 210d. The chain links are in principle of the type which have great relative flexibility in the interconnected state and between them form through-openings or passages. Each chain link 211 has a pair of rod-shaped pins 211a, 211b which, in the upper guide device 210, lie below and run under the sliding strips 210c, 210d. The chain link has a first side 211c and a second side 211d which bear against respective support flanges 210e, 210f which bear sliding strips 210c and 210d.

The beam sides 210a, 210b forming part of the upper guide device 210 have, seen in FIG. 16, an upper essentially vertical portion 210a', 210b', a relatively steeply inclined portion 210a", 210b" following this in towards the centre, and a relatively less steeply inclined end portion 210a''', 210b'''. All these portions are plane and merge with one another without forming any dirt-collecting corners.

In order to hold the beam sides 210a, 210b in the position shown in FIG. 16, one or more connecting piece(s) 212 is or are present, depending on the length of the beam sides. The connecting piece 212 in FIG. 16 can be installed in the desired position along the beam sides 210a, 210b without the need for hole-punching in the beam sides and can also be used for joining adjacent beam sides.

The connecting piece 212 comprises a first element 212a of essentially wedge-shaped exterior shape in the portions 212a', 212a" with, seen in FIG. 16, cone or inclination angles corresponding essentially to the cone or inclination angles of the inclined beam side portions 210a", 210a'''.

The connecting piece 212 also comprises a second element 212b of the "female type" with a recess facing towards the element 212a, with a shaping essentially complementary to the said exterior shape of the element 212a.

The outer design of the first element 212a of the connecting piece, that is to say the shaping seen from the working chain strand, is rounded in a gently inclined way without corners. The corresponding outer design of the second element 212b of the connecting piece comprises only smooth, essentially vertical surfaces.

The two elements 212a, 212b of the connecting piece 212 together form a unit which, in the mounted state of the beam sides, constitutes a self-draining connecting piece, that is to say a connecting piece without dirt-collecting corners and which, together with the beam sides 210a, 210b designed in the way described and leaving between them a drainage gap, provides a self-draining guide device for the working part of the conveyor.

According to what can be seen in principle in FIG. 16, a fastening element 213, in the form of a clamping bolt, extending vertically and centrally through the elements 212a and 212b of the connecting piece is present. By means of this clamping bolt, the elements 212a, 212b are clamped together, and they secure between them, with wedge action, the beam sides 210a, 210b. The fastening element 213 therefore acts in a direction at right angles to the plane of the working chain strand. In the embodiment shown, a seal 214 is included between interacting surfaces 210a'', 212a'; 210b'', 212a' and 210a''', 212a''; 210b''', 212a'' on the respective beam side 210a, 210b and the element 212a. The seal element 214 also extends over the lower horizontal portion of the element 212a in FIG. 16.

With the embodiment described of the beam sides 210a, 210b and the connecting piece 212, the beam sides forming the working chain guide are therefore secured, leaving, as can be seen from FIG. 16, a gap 215 between the lower longitudinal edges of the beam sides in the figure.

Between the beam sides 210a, 210b, a space which tapers in the direction towards the gap 215 and is in principle wedge-shaped with plane inclined surfaces is formed, where any spillage from the product on the working part of the chain 211 can flow unhindered from the chain towards the gap 215. This gap 215 is interrupted only by, depending on the embodiment, one or more connecting piece(s) 212 which, as mentioned previously, is or are nevertheless of self-draining design and thus provide the beam construction as a whole with a self-draining feature in spite of the presence of these connecting pieces.

The second element 212b of the connecting piece 212 has at the bottom a pair of bracket-like holders 216, which, in the illustrative embodiment shown, are manufactured separately and screwed firmly into the element 212b. Supported in these holders 216 is a second chain guide device in the form of a return beam 217 for guiding and supporting the conveyor chain in the return direction. This return beam is in principle U-shaped, and the outside of its base part 217a faces towards the gap 215. The pins 211a, 211b of the chain links slide on the inwardly directed flanges 217b of the return beam 217. The return beam thus screens the underside of the conveyor chain from any contamination originating from spillage coming out through the gap 215.

As shown in principle in FIG. 16, two small pins 218 (only one of which is visible in the figure) are present centrally on the element 212a of the connecting piece 212 close to the lower plane portion of the element 212a. These pins 218 are oriented in the longitudinal direction of the beam sides 210a, 210b and are intended to support an elongate element 219, in the embodiment a tube of relatively small diameter, between adjacent connecting pieces 212 or between a connecting piece 212 and another arrangement along the conveyor, for example an end piece with guide wheels. These elongate elements 219, which in FIG. 16 lie above the gap 215, reduce the gap width seen from below in the figure but leave, adjacent to the respective connecting piece 212 and along the entire gap between the connecting pieces or equivalent, a continuous flow-friendly passage for impurities and of course the cleaning agent which may be used, for example water under pressure or water vapour.

The elongate element 219 serves as protection against fingers or the like being inserted into the interior of the space between the beam sides.

Having described the construction in principle of the load-bearing guide device 210 of the conveyor, its return beam guide device 217 and its connecting piece 212, reference is now made to FIGS. 17-21 for further explanation of the construction.

FIG. 17 corresponds in principle to FIG. 16, with the sole difference that the chain links are omitted and that FIG. 17 was originally produced using a black/white cad technique. The illustration in FIG. 16 was produced using colour cad and shows somewhat more clearly the gently rounded, self-draining shape of the wedge-shaped element 212a of the connecting piece.

Figure 18:
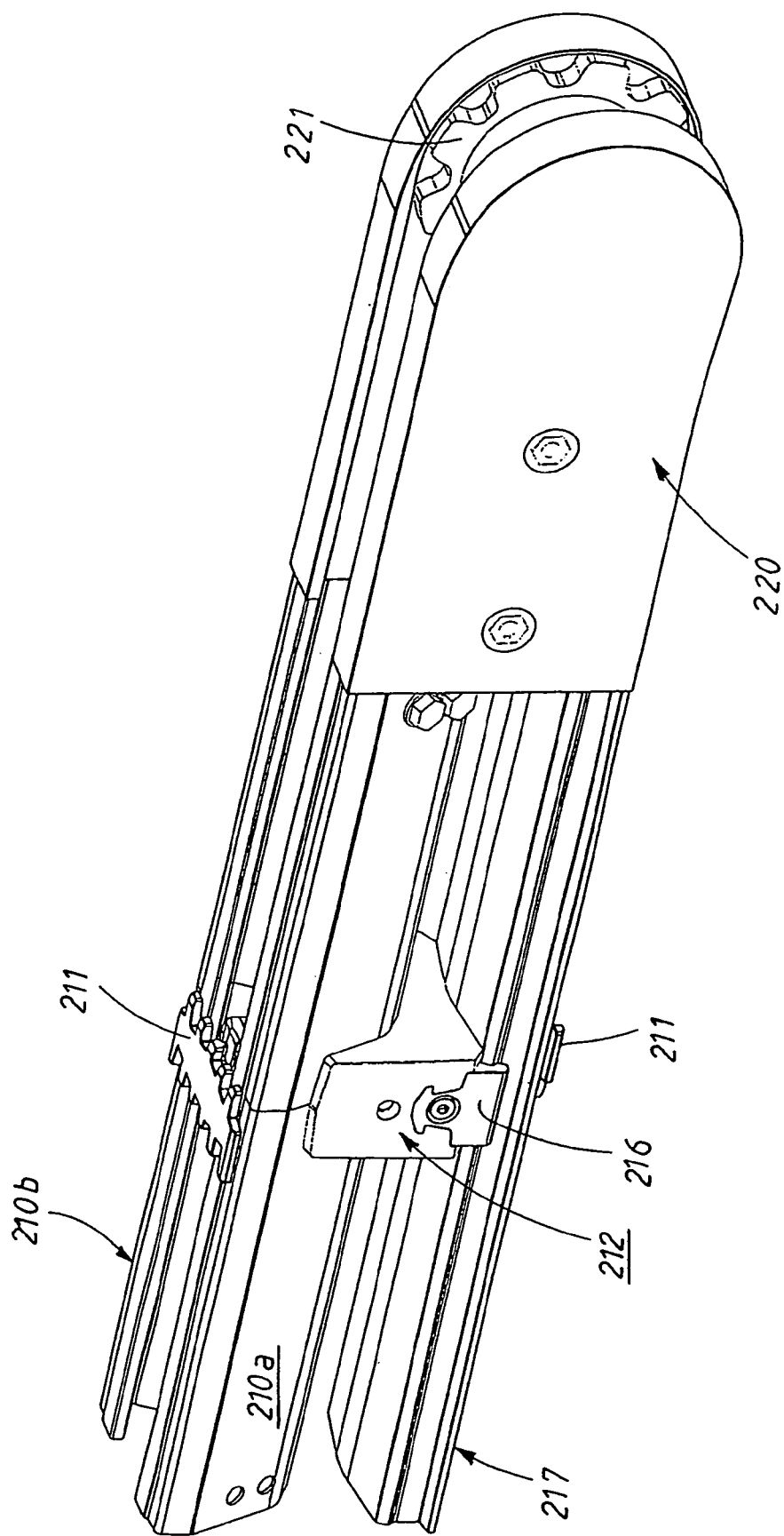
FIG. 18 shows a perspective view of part of a conveyor according to an embodiment provided with an end piece containing guide wheels.

FIG. 18 shows two beam side lengths 210a, 210b joined by means of the connecting piece 212, and also a chain turning piece 220 at one end of the conveyor. At the other end of the conveyor, there is a corresponding turning piece which, like a conveyor stand, has not been shown in the figures. It will already have become clear from the description that such a stand is normally provided in order to support the chain strands, the working strand and the return strand, in a horizontal plane.

It can be seen clearly from FIG. 18 that the return beam 217, that is to say the beam screening the underside of the chain from contamination, has the same extent in the longitudinal direction as the beam sides 210a, 210b.

FIG. 18 also shows a guide wheel 221 (another such wheel is present in the enclosed part). The pins 211a, 211b on the chain links engage in recesses in these guide wheels. The conveyor chain is usually driven at one of its ends by virtue of guide wheels being provided with a driving axle.

Figure 19:
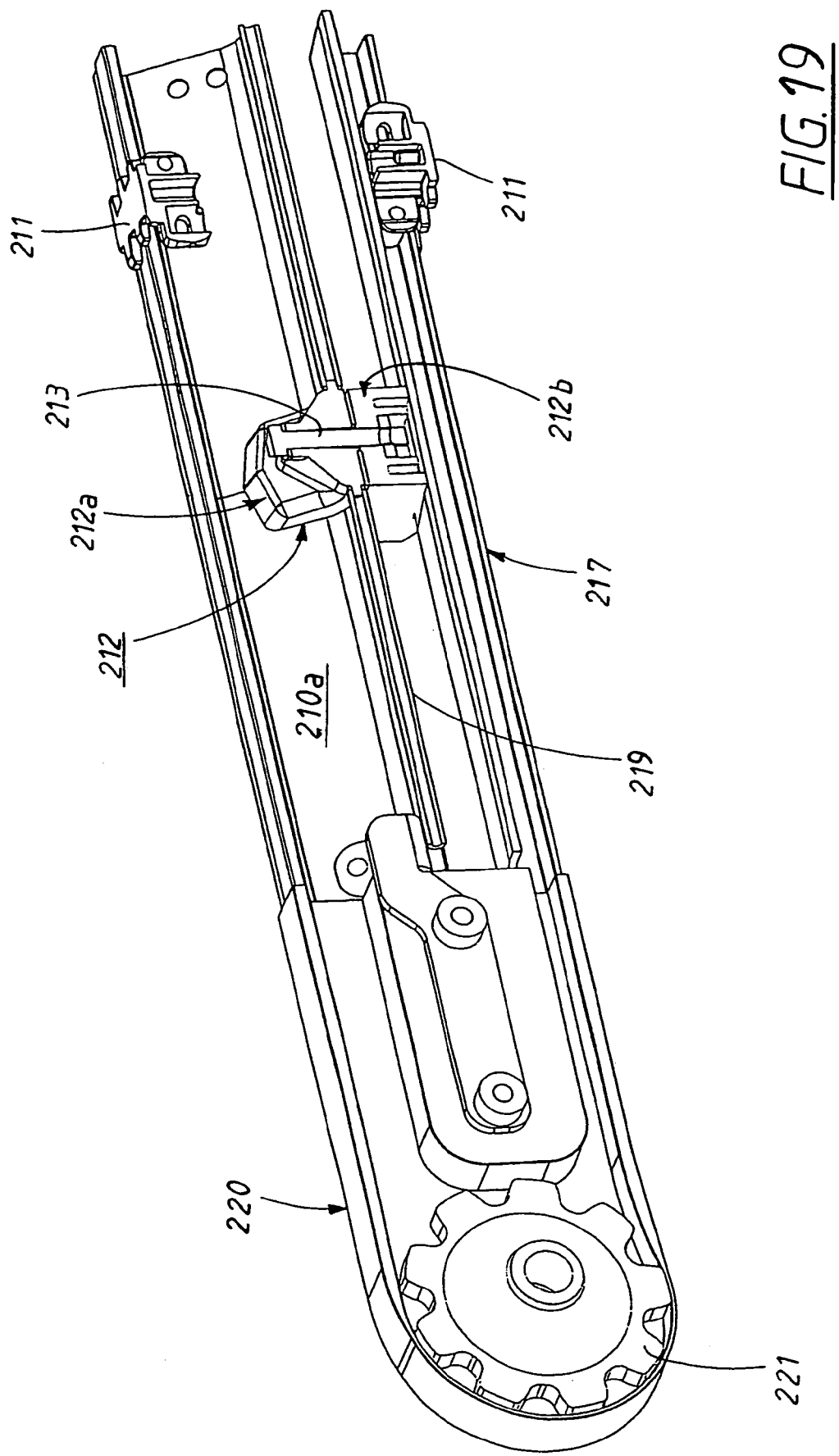
FIG. 19 shows the arrangement in FIG. 18 sectioned in the longitudinal direction.

FIG. 19 is a longitudinal section centrally through the arrangement in FIG. 18 and illustrates clearly the components/elements described in connection with FIG. 1. It can be seen, for example, that the element 219 providing protection against fingers or the like being inserted extends all the way to the end piece and adjoins it.

Figure 20:
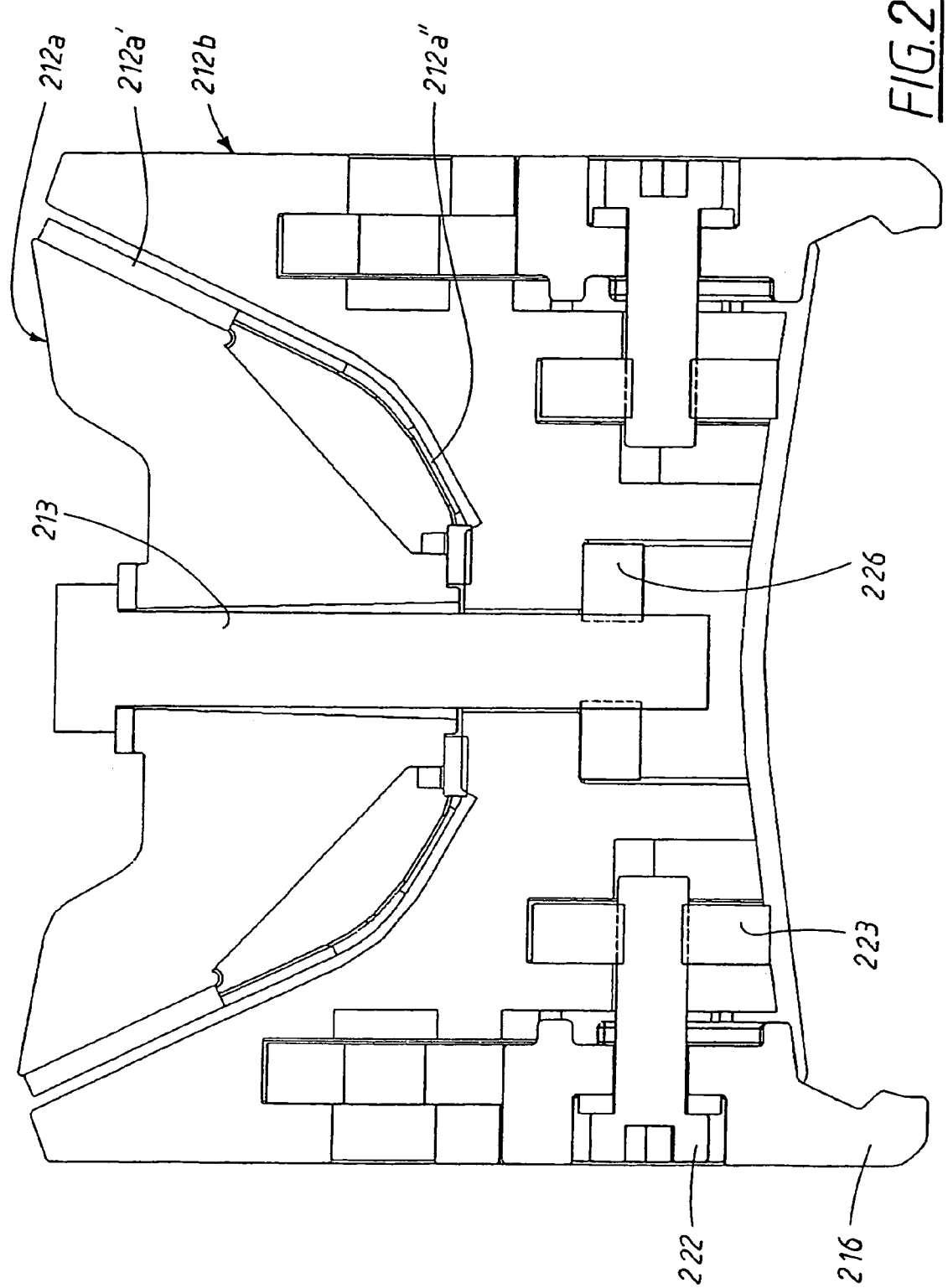
FIG. 20 shows a cross section through a clamping-together arrangement/connecting piece in one embodiment thereof.
Figure 21:
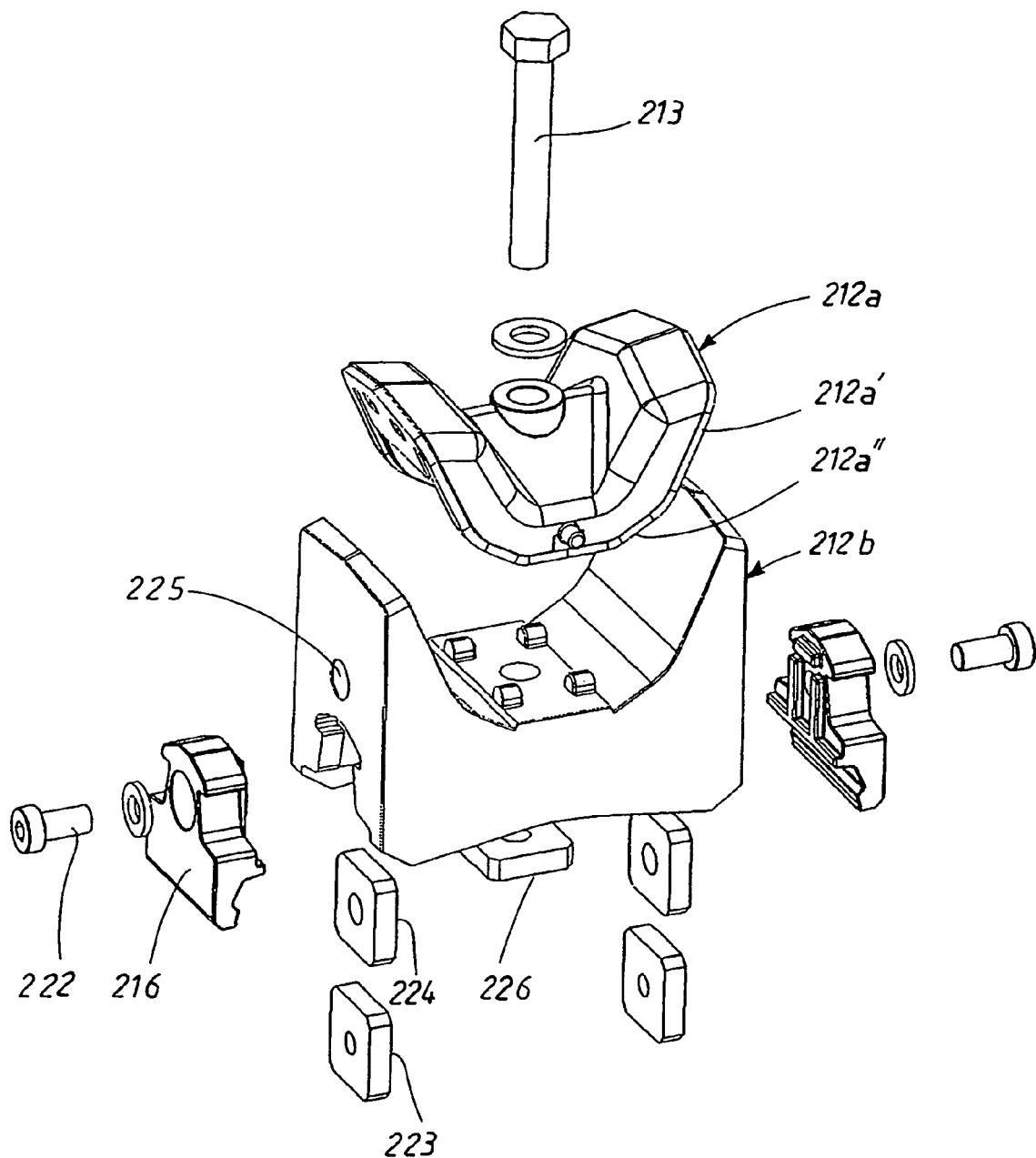
FIG. 21 shows an exploded view of the clamping-together arrangement/connecting piece in FIG. 20.

FIG. 20, together with FIG. 21, illustrates in detail the construction of a connecting piece according to the invention.

It can be seen from FIG. 21, for example, that the brackets 216 supporting the return beam are manufactured separately and can be inserted into complementary recesses in the element 212b. The brackets are fastened by bolts 222 which are driven into square nuts 223 which are retained inside corresponding recesses in the element 212b.

A further square nut 224 is shown, and the purpose of this is to be located inside the opening 225 so as, with a bolt, to support a vertical post serving as a support in a rail along the working strand of the conveyor.

The clamping bolt 213 shown in FIG. 16 and discussed in connection therewith has a corresponding square nut 226.

In the introduction, and in connection with the description of the various drawing figures, mention has been made of certain detailed designs, including material selection etc. It will nevertheless be understood that the inventive idea is not limited to what has therefore been indicated by way of example, but the invention is limited only by what is indicated in the accompanying patent claims.

The invention claimed is:

1. Blank for forming a bent metal curve element for an endless chain conveying track which comprises a support flange intended to constitute a guide rail for a first side of chain elements forming part of the chain conveying track, and a web from which the said flange extends, where the said web is intended to provide torsional rigidity in the curve element, characterized in that the blank consists of a plane metal sheet, which has a first end piece which is intended to be shaped into the said flange and a central piece which is intended to constitute the said web, where said first end piece has a set of slots which run from an edge present on the end piece to the said central piece and said slots widen essentially continuously in the direction towards the said edge, whereby opposite end surfaces present in the slot being arranged so as to form support surfaces resting against one another when bending takes place, which support surfaces extend along essentially the entire length of each slot.

2. Blank according to claim 1, characterized in that said slots form projections located on consecutively following flange elements separated by the slots, where the said projections engage in one another by virtue of the slot forming an overlapping area, whereat opposite end surfaces present in the slot being arranged so as to bear against one another after bending around the said second axis of rotation.

3. Blank according to claim 2, characterized in that the said projections are designed as a pin-shaped projection on a first flange element, which extends essentially in the longitudinal direction of the flange between projections on a second, consecutively following flange element, which extend on either side of the pin-shaped projection.

4. Blank according to claim 2, characterized in that the said projections are designed as hooks which engage in one another after rotation around the said second axis of rotation.

5. Blank according to any one of claims 1-4, characterized in that the end piece and the central piece are joined in a transition area which has a fold indication.

6. Blank according to claim 5, characterized in that the said fold indication has a set of slits which run along the said transition area and are interrupted by web elements which connect the flange to the central piece.

7. Blank according to claim 6, characterized in that the said slots run up to the said slits, and in that at least one web element is located between each pair of slots.

8. Blank according to claim 7, characterized in that the said central piece has cutouts in pairs which delimit fastening plates, where the said cutouts in pairs meet one another at an upper and a lower, second web element.

9. Blank according to claim 8, characterized in that the said upper and lower, second web elements are positioned vertically in relation to the said fold indication.

10. Blank according to claim 9, characterized in that the said central piece has an upper and a lower longitudinal band-shaped structure, which structures are connected by crosspieces, and in that the area between two crosspieces is partly covered by cover elements which are connected to at least one of the said longitudinal band-shaped structures and/or crosspieces by a set of third web elements.

11. Blank according to claim 10, characterized in that the plane metal sheet has a second end piece which is intended to be shaped into a second flange which extends from the said web in the same direction as the said first flange, where the said second end piece has a set of slots which run from an edge present on the second end piece to the said central piece.

12. Bent metal curve element for an endless chain conveying track, which curve element is made from a blank according to claim 11, the curve element comprising a support flange intended to constitute a guide rail for a first side of chain elements forming part of the chain conveying track, and a web from which the said flange extends, where said web is intended to provide torsional rigidity in the curve element, characterized in that said flange has a set of slots which run from an edge present on the end piece to the said central piece.

13. Curve unit for an endless chain conveying track comprising a first curve element having a first support surface intended to constitute a guide rail for a first side of chain elements forming part of the chain conveying track, a second curve element having a second support surface intended to constitute a guide rail for a second side of chain elements forming part of the chain conveying track, and a bracket which supports the said first and second support surfaces in a parallel manner to form a curved track, characterized in that at least the said first curve element (40) consists of a bent metal curve element according to claim 12, said first support surface consisting of a first support flange which extends from a web of the bent metal curve element, where the first support flange has a set of slots which run from a first edge present on the first flange to the said first web.

14. Curve unit according to claim 13, characterized in that the said second curve element consists of a second bent metal curve element, the second curve element comprising a second support flange intended to constitute a guide rail for a second side of chain elements forming part of the chain conveying track, and a second web from which the said second support flange extends, where said second support flange has a set of slots which run from an edge present on the second flange to the said second web, where the said first curve element has a convexly curved web with the said first flange facing towards a centre of curvature of the said first web and the second bend element has a web which is mounted parallel to the said first web and also a second flange which faces towards the first flange, the said first and second flanges forming a track for chain elements forming part of the said chain conveying track.

15. Curve unit according to claim 13, characterized in that the said second curve element comprises a rotatably arranged support surface intended to constitute a guide rail for a second side of chain elements forming part of the chain conveying track, in that the first curve element has a convexly curved web with the said first flange facing towards a centre of curvature of the said first web, and in that the support surface of the second curve element is mounted coaxially with the said first flange, the said first flange and the support surface forming a track for supporting chain elements forming part of the said chain conveying track.

16. Bend unit according to claim 15, characterized in that the said bracket consists of an essentially plane metal plate made from thicker material than the said first bend element, and in that the said plane metal plate bears a set of bent lugs to which the said first and second bend elements (40, 51) are attached.

17. Endless chain conveying track comprising a curve unit and a conveying chain which runs through the said curve unit, characterized in that the curve unit is designed according to claim 16 and comprises a first metal curve element which comprises a first support flange which constitutes a guide rail for a first side of chain elements forming part of the conveying chain, and a first web from which the said first support flange extends, where the said first web is intended to provide torsional rigidity in the first bend element, a second curve element which has a second support surface which constitutes a guide rail for a second side of chain elements forming part of the conveying chain, and a bracket which supports the said first and second bend elements.

* * * * *